PROCESS UTILIZING THE COMBINATION OF MISCIBLE AND THICKENED FLOODS IN PETROLEUM RECOVERY

Original Filed June 19, 1963

INVENTOR.
CLAUDE P. COPPEL
BY
ATTORNEY

United States Patent Office

Re. 26,260
Reissued Sept. 5, 1967

26,260

PROCESS UTILIZING THE COMBINATION OF MISCIBLE AND THICKENED FLOODS IN PETROLEUM RECOVERY

Claude P. Coppel, La Habra, Calif., assignor to Marathon Oil Company, Findlay, Ohio, a corporation of Ohio Original No. 3,261,399, dated July 19, 1966, Ser. No. 289,090, June 19, 1963. Application for reissue Nov. 15, 1966, Ser. No. 597,501
6 Claims. (Cl. 166—9)

Matter enclosed in heavy brackets [ ] appears in the original patent but forms no part of this reissue specification; matter printed in italics indicates the additions made by reissue.

*ABSTRACT OF THE DISCLOSURE*

*The present invention comprises a process for recovering hydrocarbons from subterranean oil-bearing formations having drilled therein at least one each of a production well and injection well consisting essentially of:*

*(a) injecting into the oil-bearing formation a slug of emulsion,*

*(b) subsequently injecting into the formation a thickened water flood material differing from said emulsion in character, thereafter,*

*(c) injecting a drive fluid into the formation to displace hydrocarbons toward said production well, and*

*(d) recovering oil from said formation.*

This application is a continuation-in-part of my copending United States application Serial No. 235,139, filed Nov. 2, 1962, and now abandoned.

This invention relates to the use of thickened water in oil recovery and more particularly to a process wherein an emulsion is injected into a formation, followed by a thickened flood material, and driven through the formation with water or other drive material.

Oil can be recovered from subterranean formations by injecting oil-external emulsions into subterranean formations where the emulsions act as water-compatible slugs. The initial slug injected into a formation is followed by a water-external emulsion of decreasing viscosity. Finally water is used to drive these materials through the formation.

I have now discovered that the water-compatible material required in the above processes can be reduced in size or eliminated by driving the emulsion with thickened flood material. This technique retains the excellent properties of the emulsion flood. Furthermore, the amount of surfactant required to make up the oil and water compatible emulsions is reduced considerably when a thickened water flood is used.

Prior to describing my invention in detail, a brief review of the requirements for an efficient flood might be helpful. The efficiency of an oil recovery process is determined by the amount of oil recovered in flooding operations compared to the amount of oil in the formation at the time flooding is initiated. To have a good efficiency, the flooding media should have a viscosity, at least at its leading edge, greater than that of the crude being displaced; the flood material should preferentially displace the oil from the surface of the formations; and should be of a higher viscosity than that of the crude in the formation. To be the most economical, the flood must utilize water as a major portion of the drive material. Water has a low viscosity; therefore, to obtain maximum efficiency and economy, the viscosity of the displacing material should be reduced gradually from its high at the oil interface to that of water, the primary drive material.

The figures of the attached drawing illustrate various recovering techniques utilizing emulsions. FIGURES 2–7 disclose various procedures coming within the scope of this invention. The letter designations are the same for all figures.

Figure 1:
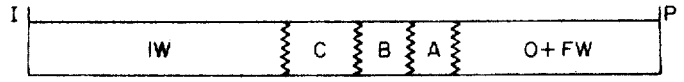

I represents an injection well and P, a producing well. The sequence of FIG. 1 represents the normal emulsion flood described above. In FIG. 1, O and FW represent oil and formation water, respectively. IW is injected water; and slugs A, B, and C represent oil-external emulsions, water-external emulsions, and a water-external emulsion having an incremental viscosity reduction from that of slug B to that of IW, respectively. In use, O and some FW are displaced from the formation through well P by initial injection of slug A; followed, in order, by the injection of slugs B and C; and finally IW through well I.

Figure 2:
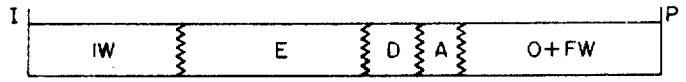

In the process of FIG. 2, slug A has been reduced in volume and slugs B and C of FIG. 1 have been replaced by slug D (a water-miscible thickened flood material) and slug E (a water-miscible thickened flood material having incremental viscosity reduction from a viscosity about that of slug A to that of IW).

Figure 3:
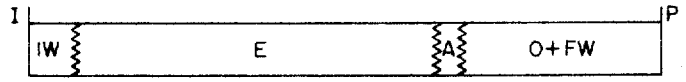

In the process of FIG. 3, slug A has been further reduced and the incremental reduction in viscosity accomplished with a much larger slug E.

Figure 4:
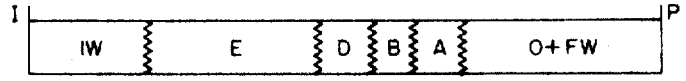

In the process of FIG. 4, slugs A and B are driven by a smaller slug E for incremental viscosity reduction. This process provides three slugs—A, B and D—of approximately equal viscosity and also a very stable front having little fingering or channeling.

Figure 5:
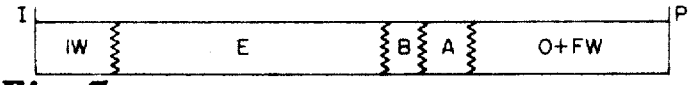

In the process of FIG. 5, slug D of FIG. 4 has been omitted and slug E enlarged to provide a more gradual viscosity gradient.

Figure 6:
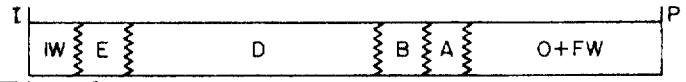

The process represented by FIG. 6 is essentially that of FIG. 4, although slug D has been increased appreciably to provide a highly stable frontal movement.

Figure 7:
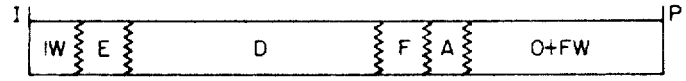

In the process of FIG. 7, slug F (an oil-miscible thickened flood material) has been substituted for slug B of FIG. 6.

Other variations of my process are obvious, and it is intended that they be included within the scope of my invention as claimed. For example, in the process of FIG. 3, an oil-miscible thickened slug, having an incrementally reduced viscosity from its leading to its trailing edge, can be substituted for E and a hydrocarbon gas drive substituted for IW.

As mentioned previously, the first slug injected into the subterranean formation is an oil-compatible emulsion. These emulsions are opaque and are preferably relatively stable.

An effective emulsion is made up of 50% Tip Top crude, 40% water, 4% of a sorbitan fatty ester sold under the mark Atpet 200, and 6% of an alkyl aryl sulfonate detergent. The emulsion is prepared by dissolving the surfactants in cetane and incrementally stirring water into the cetane-surfactant mixture. This particular emulsion has a viscosity of 23–27 cps.

While the above oil-compatible slug is a preferred formulation, other surfactants or petroleum fractions can be utilized in making up emulsions according to well-known formulation techniques.

Thickened flood materials which can be utilized in the process of this invention are legion. For example, sugars, dextrans, carboxymethyl cellulose, amines, polymers, glycerin, alcohols, and mixtures of these agents have been suggested for use in thickened water floods. Thickened hydrocarbon slugs known to the art include polyisobutylene or rubber in benzene.

A thickened water flood of particular utility utilizes up to 1% of polyacrylic acid having molecular weight and the range of about 1–10 million. Viscosities in excess of 50 cps. are achieved at the 1.0% level.

As is evident from a perusal of FIGS. 1–7, quite a variety of combinations of emulsion and thickened flood slugs can be utilized in my process. Normally, from about 1 to about 20% of the formation pore volume of combined slugs is necessary to effect good oil recoveries. Preferably, from about 2 to about 10% combined slugs are used. The total amount of emulsion and thickened slug required varies with the acreage to be flooded. Total slug volumes of 2.5–5.0% are adequate to flood a 40–50 acre area, while 5–10% of the pore volume of total slugs are necessary in a 3–5 acre area.

The combined slug volume can be divided as desired, though the emulsion slug(s) should comprise about 5–50%, and preferably 10–30%, of the total combined slugs.

The following example more fully illustrates my invention, but it is not intended that my invention be limited to the particular emulsion, thickened water material, etc. Rather, it is intended that all equivalents obvious to those skilled in the art be included within the scope of my invention as claimed.

Example 1

In a set of experiments using Tip Top crude in an emulsion made of 25 ml. crude, 20 ml. water, 2 grams Atpet 200, and 3 grams of G-3300, the results of the following table were obtained when cetane was displaced from a core having a pore volume of 10.3 ml.

TABLE 1

| Vol. of Emulsion (pore vol) | Follow-up Fluid | Viscosity of Follow-up Fluid (cps.) | Vol. Cetane Displaced at 10.0 ml. Inject |
|---|---|---|---|
| 1.0 | | | 10.0 |
| 0.30 | $H_2O$-Glycerin | 20.0 | 10.0 |
| 0.10 | $H_2O$-Glycerin | 20.0 | 9.7 |

These tests indicate that the emulsion had the displacement efficiency of a miscible fluid at high slug volume (30% or greater) and performed almost as well as 10% slug volume.

Now having described my invention, what I claim is:

1. The process for recovering fluid hydrocarbons from subterranean formations having drilled therein at least one each of a production well and an injection well consisting essentially of (a) injecting into the subterranean formation at least one slug of an emulsion, (b) injecting into said formation at least one slug of a thickened flood material differing from said emulsion in character, at least a portion of said material being incrementally diminished in viscosity from about that of the emulsion at the leading edge of the material to about that of a drive material at the interface between the thickened flood material and a drive fluid, (c) injecting a drive fluid into the formation to displace hydrocarbons toward said production well, and (d) recovering oil from said formation.

2. The process of claim 1 wherein the total volume of emulsion slug and thickened flood material injected into the formation comprises from about 1 to about 20% of the pore volume of the formation from which oil is recovered.

3. The process of claim 2 wherein the emulsion comprises about 5–50% of the total volume of the emulsion and thickened flood material volume.

4. The process for recovering hydrocarbons from subterranean formations having drilled therein at least one each of a production well and an injection well comprising (a) injecting into the subterranean formation a first slug of an oil-external emulsion, (b) injecting into the formation at least one slug of a nonemulsiod thickened water flood material, at least a portion of said thickened water flood material being incrementally diminished in viscosity from about that of the emulsion to about that of water, (c) injecting water into the formation to displace hydrocarbons toward said production well, and (d) recovering oil from said formation.

5. The process for the recovery of hydrocarbons from subterranean oil-bearing formations having drilled therein at least one each of a production well and an injection well consisting essentially of (a) injecting into the oil-bearing formation a slug of an oil-external emulsion, subsequently (b) injecting into the formation a thickened water flood material differing from said emulsion in character, thereafter (c) injecting water into the formation to displace hydrocarbons toward said production well, and (d) recovering oil from said formation.

*6. The process for recovering hydrocarbons from subterranean oil-bearing formations having drilled therein at least one each of a production well and an ejection well consisting essentially of (a) injecting into the oil-bearing formation a slug of emulsion, (b) subsequently injecting into the formation a thickened water flood material differing from said emulsion in character, thereafter (c) injecting a drive fluid into the formation to displace hydrocarbons toward said production well and (d) recovering oil from said formation.*

References Cited

The following references, cited by the Examiner, are of record in the patented file of this patent or the original patent.

UNITED STATES PATENTS

| | | | |
|---|---|---|---|
| 2,867,277 | 1/1959 | Weinaug et al. | 166—9 |
| 2,988,142 | 6/1961 | Maly | 166—9 |
| 3,149,669 | 9/1964 | Binder et al. | 166—9 |

CHARLES E. O'CONNELL, *Primary Examiner.*

STEPHEN J. NOVOSAD, *Examiner.*